United States Patent [19]
Johnson

[11] 3,769,935
[45] Nov. 6, 1973

[54] NON-CORROSIVE AQUARIUM CONSTRUCTION AND METHOD

[76] Inventor: Boyd R. Johnson, 2034 Ashton Cir., Salt Lake City, Utah 84109

[22] Filed: Aug. 1, 1972

[21] Appl. No.: 276,994

[52] U.S. Cl. .................................................. 119/5
[51] Int. Cl. ............................................ A01k 63/00
[58] Field of Search ................... 119/5, 3; 220/82 R, 220/81, 84

[56] References Cited
UNITED STATES PATENTS

| 3,633,790 | 1/1972 | Voss | 119/5 X |
| 3,529,574 | 9/1970 | Kelley et al. | 119/5 |
| 3,232,272 | 2/1966 | Dosamantes De Jose et al. | 119/5 |
| 3,320,928 | 5/1967 | Smith | 119/5 X |

FOREIGN PATENTS OR APPLICATIONS

| 457,025 | 7/1968 | Switzerland | 119/5 |
| 453,787 | 6/1968 | Switzerland | 119/5 |

Primary Examiner—Louis G. Mancene
Assistant Examiner—J. N. Eskovitz
Attorney—H. Ross Workman

[57] ABSTRACT

A non-corrosive aquarium and method which makes it possible for salt water aquarium life to be exhibited and maintained in a near natural environment. The aquarium, in addition to maintaining a salt water environment, is also constructed in a manner which makes it complementary with home or office decor. The aquarium is sealed with an adhesive sealant and a supporting molding is bonded to the corners to provide support to the side surfaces. The molding bonded to at least one corner contains a conduit channel which allows wires or air tubing to be invisibly conducted along the outside of the container to the top. The method of operation includes a method for circulating the water to achieve a high filtering efficiency by air displacement of water at opposed corners of the aquarium. The air displacement in aquariums having selected dimensions produces harmonic fluid flow to maintain the aquarium life in an envigorating environment necessary to the survival of salt water fish.

17 Claims, 7 Drawing Figures 3,769,935

NON-CORROSIVE AQUARIUM CONSTRUCTION AND METHOD

BACKGROUND

1. Field of the Invention

This invention relates to aquariums and more particularly to non-corrosive aquariums having improved structural characteristics for maintaining a superior environment for fish.

2. Prior Art

Aquariums and water life exhibition apparatus have long been a popular piece of furniture in many homes and offices. In general, aquariums have been encased with a metal framework which supports and seals the transparent side in a leak-proof configuration. These metal frame devices have usually been limited to fresh water since salt water greatly corrodes the metal frame and eventually causes the aquarium to leak and to become generally unattractive.

The displeasing appearance of the aquariums has also long been a problem. Water life makes an attractive addition to a room and is a stimulating conversation piece; however, the unappealing appearance of the aquarium detracts from the addition which the water life makes to the room decor. There have been several attempts to eliminate the collateral unpleasing effect of the appearance of the aquarium which maintains the environment for the water life. One solution has been the costly and permanent mounting of the aquarium in a wall such that the front surface is flush with the wall. That solution to the problem has not always been practical particularly when permanent alteration of the home, apartment or office is undesirable. Other attempts at solution have included making the supporting metal framework highly polished or otherwise more attractive. Still, except in rare circumstances, the metal framework does not particularly complement the room's decor. Many people who are interested in aquarium life desire to keep salt water fish since they are unique in their strange shapes and magnificent colors. Due to the corrosion problem, however, aquarium owners have been resigned to maintaining fresh water aquarium life.

Another problem with previously known aquariums is the traditional shape which they have taken. The short nearly rectangular shape of prior art aquariums makes it incapable, without extensive pumping of water, of producing internal water currents necessary to the survival of salt water fish. The pumping apparatus and associated supply conduit is costly, noisy, and unsightly in appearance.

Yet another deficiency of most previously known aquariums is the unsightly appearance of tubes and wires leading to the aquarium. Here again, no prior art construction has solved the problem of unsightly life support apparatus for aquariums.

For the above described reasons, it is desirable to use a non-corrosive aquarium and concealed support apparatus which complements normal room and office decor to maintain the proper environment for salt water fish.

BRIEF SUMMARY AND OBJECTS OF THE INVENTION

The present invention comprises a novel non-corrosive aquarium apparatus and method therefor. The invention is capable of retaining fresh or salt water and of producing, in combination with a simplified bubbling device, an environment that will promote the maintenance and life of fresh or salt water fish. Furthermore, the invention facilitates rapid construction of an aquarium which conceals support apparatus so that the aquarium is pleasing in appearance and complements usual office or home furniture.

It is a primary object of this invention to provide an improved non-corrosive aquarium which complements the decor of a home or business.

It is a collary object of this invention to provide a novel method of constructing a decorative non-corrosive aquarium.

It is another primary object of the present invention to provide a unique aquarium and method for accommodating and creating improved circulation of water within the aquarium.

These and other objects and features of the invention will become more fully apparent from the following description and appended claims taken in conjunction with the accompanying drawings.

DETAILED DESCRIPTION OF THE PREFERRED EMBODIMENTS

General

Although the invention shown in FIG. 1 may be used for any one of a wide variety of purposes including a fresh water aquarium or a terrarium, the present invention will be described, for simplicity, in connection with use as a salt water aquarium. The capability of this aquarium to maintain a salt water environment is of course an important and novel feature. It will be understood, however, that an aquarium which is capable of maintaining a salt water environment will be inherently capable of retaining fresh water or being used as a terrarium.

There has long existed a desire among those who cultivate and enjoy aquarium life to keep salt water fish owing to the unique shapes and magnificent colors of such sea life. Until the present invention it has proven very difficult and expensive for an individual owner to maintain a salt water aquarium.

Some of the problems which have existed in connection with conventional aquarium apparatus prior to this invention are solved by its novel structure and method. It will be appreciated that an inherent problem associated with retaining salt water is that of corrosion of all metal parts. This invention is constructed entirely of non-corrosive elements and therefore is not subject to the metallic deterioration which is present in conventional aquariums. As will be more fully developed hereafter, the illustrated embodiments of the invention also eliminate the exposure of unsightly wires and tubes which are normally associated with aquarium lighting and filtering apparatus. It should be noted at this point that one additional factor which must be considered in keeping salt water fish in an aquarium is the need for a substantial circulation of the water within the aquarium to envigorate and maintain salt water fish.

The Structure

Figure 1:
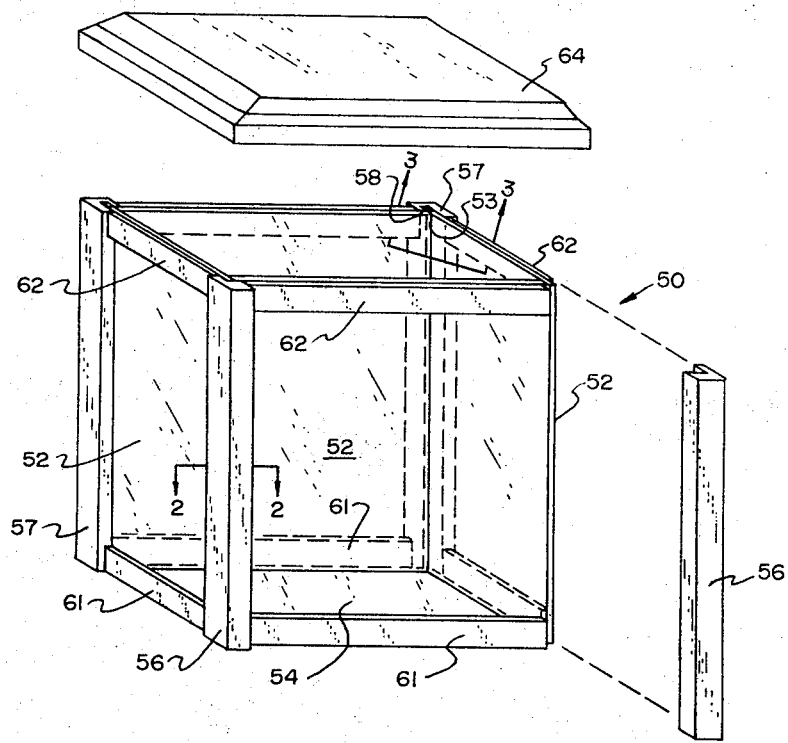
FIG. 1 is a perspective illustration of a presently preferred embodiment of the invention particularly illustrating the framework which encloses the aquarium and illustrating the lid in exploded perspective.

According to the presently preferred embodiment of the invention, as illustrated in FIG. 1, an aquarium generally designated 50 is provided. The sides 52 of the aquarium are cut from glass or transparent plastic sheets according to the predetermined size of the aquarium to be constructed. It has been found that when the aquarium is sized so as to support a column of water having a depth which is equal to or greater than either of the remaining two dimensions, harmonic flow of water in the aquarium will be developed using the water displacement system which will be subsequently more fully described.

Figure 2:
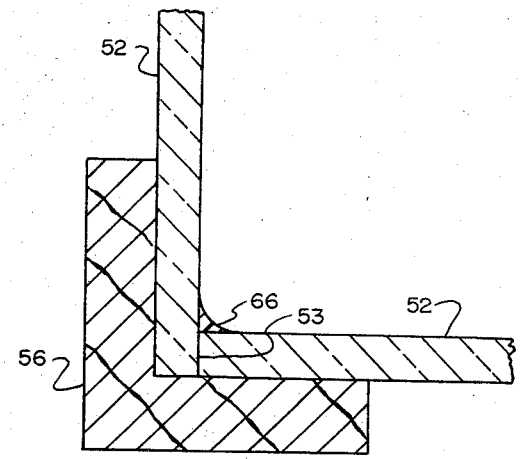
FIG. 2 is a fragmentary transverse cross-sectional view taken along line 2—2 of FIG. 1.

The sides 52 are bonded together along their edges in a generally right angle configuration as best shown in FIG. 2. The corner 53 thus formed functions as a corner of the aquarium. It should be appreciated that although the aquarium is shown rectangular in form in the illustrated embodiment, a variety of other geometric configurations could also be used.

The sides 52 may be secured together with any suitable adhesive or bonding agent, one suitable adhesive agent being a one part moisture cured thropic silicone rubber manufactured by Dow-Corning and General Electric companies. As illustrated in FIG. 2, excess adhesive sealant 66 may be smoothed and distributed to form a bead along the inside of the corner 53. The bead not only appreciably improves the appearance of the inside of the aquarium, but also distributes hydrostatic pressure so as to improve the strength of the corner seal. The seal also substantially reduces the likelihood of water leakage. It is also pointed out that the corner moldings 56 and 57 hide the bead 66 from view so that it can be rapidly applied at low cost without adversely affecting the aesthetic appearance of the aquarium.

Referring again to FIG. 1, each of the corners 53 is nested within the acute angle of a generally L-shaped corner molding 56 of 57. The corner molding is preferably formed of wood although plastic, polyurethane or any one of a variety of other suitable materials could be used. Each of the corner moldings traverses substantially the entire length of the sides 52 and, in the embodiment of FIGS. 1 and 3, extends somewhat above the upper edges 60 of the sides 52. The corner moldings 56 are decorative and substantially improve the appearance of the aquarium 50. In addition, the corner moldings 56 improve the structural strength of the aquarium 50 so that very large aquariums can be constructed to safely contain unusually large volumes of water. The strength lent by the corner moldings 56 and 57 can best be understood by referring again to FIG. 2. The surface pressure on one side 52 is transmitted outwardly to one of the legs of the L-shaped corner molding 56. The outward force on the corner molding is then transferred to a lateral force on the adjoining side 52 which is sealed to the corner molding 56. The same transfer of force by the moldings 57 would occur for all of the sides which are adhesively secured to the molding 57.

The bottom of the aquarium 50 is closed with a floor 54 which is sealed to each of the sides 52 in the same manner as the side to side connection described and illustrated in FIG. 2. Edge molding 61 spans between each of the corner moldings and is preferably adhesively secured to the sides 52. Of course, if desired, the edge molding 61 may form a closed path around the bottom periphery of the aquarium 50 so that the corner moldings 56 and 57 rest upon the upper surface of the edge molding 61. In that event, a channel (not shown) may be formed in the edge molding 61 so as to be in alignment with channel 58. Edge molding 61 also strengthens the joint between the bottom 54 and the sides 52.

Figure 3:
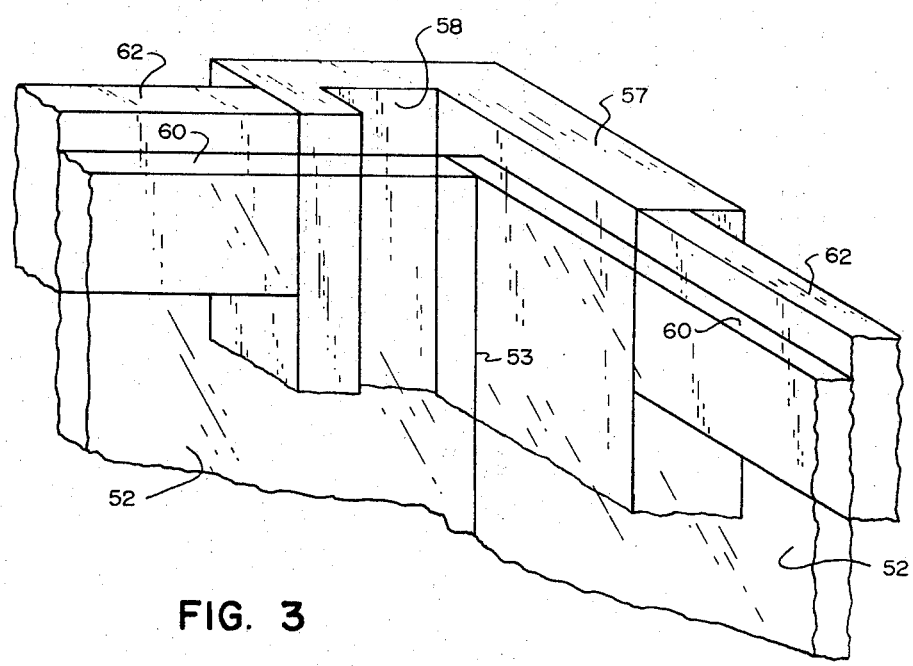
FIG. 3 is a fragmentary perspective illustration of a corner molding of the aquarium taken along line 3—3 of FIG. 1 particularly showing the channel for concealing conduits to the aquarium.

The upper periphery of the sides 52 is faced with edge molding 62 illustrated best in FIG. 3. The edge molding 62 traverses the upper edge surface 60 of the sides 52 between each of the corner moldings. Referring to FIG. 3, it is apparent that the upper edge moldings 62 are spaced somewhat above the edges 60 so as to form a retainer or lip around the periphery of the aquarium 50. This retainer or lip accommodates secure retention of a suitable lid 64 which may or may not be situated upon the aquarium 50 as desired. When the lid 64 is used, it is preferably sized so as to rest upon the edges 60. The edge moldings 62 are anchored to the sides 52 with suitable adhesive material such as the silicone adhesive previously described. If desired, excess adhesive material may be allowed to flow over the edge 60 so as to provide a cushioning bumper (not shown) on the edge 60 upon which the lid 64 (FIG. 1) may be brought to rest. Clearly, other bumper constructions could be used. The bumper is preferably allowed to cover the exposed sharp corners of edge 60 to prevent injury from the sharp corners. In addition, the bumper prevents water which may accumulate on the edge 60 from flowing or dripping down the exterior face of sides 52.

It is also observed that the edge moldings 62, in the position illustrated in FIG. 3, will visually obscure the juncture between the lid 64 and the upper surface 60 so that irregularities which may otherwise be visually apparent where the lid meets the upper edges 60 will be obscured.

With continued reference to FIG. 3, the corner molding 57 has formed therein a channel 58 which allows supply conduits carrying air, water or electricity to be invisibly retained within the corner molding 57 from the bottom to the upper surface thereof. The existence of the channel 58 eliminates the well-known problem of making the aquarium apparatus pleasing and decorative when in use in a home or business. The exposed electrical and fluid conduits which are generally associated with aquariums only increase the unsightly appearance of an aquarium. When the electrical and fluid conduits are concealed within the corner molding, a variety of special effect and support system apparatus may be used without adversely affecting the appearance of the aquarium 50. As shown in FIG. 3, the channel 58 extends somewhat above the edge 60 thereby allowing wires and tubes to be placed to the interior of the aquarium 50 without first being exposed to the outside of the molding.

If desired, the edge 60 may be notched, recessed or otherwise offset to facilitate passage of the electrical and fluid conduits to the interior of the aquarium 50 without interfering with the placement of the lid 64 (FIG. 1) upon the upper edges 60.

The channel 58 may be precut into the corner molding 57 or, if desired, the channel may be drilled after assembly. It is also presently preferred, where the moldings 57 are formed of resinous material, that the channel 58 be formed in the corner molding 57 at the time of manufacture. It is also within the scope of this invention to permanently mold or set electrical and/or fluid conduits directly into the corner molding, for example, when the corner molding is formed of polyurethane or the like. Also, it should be pointed out that although the channel 58 is illustrated as forming a part of the corner molding 57 in the rear of the aquarium 50, the channel may exist in corner moldings placed on any one or more of the aquarium corners to facilitate the desired support apparatus. If desired, the channel 58, when formed in wooden or other flammable corner moldings, may be lined with a suitable insulating material.

Figure 4:
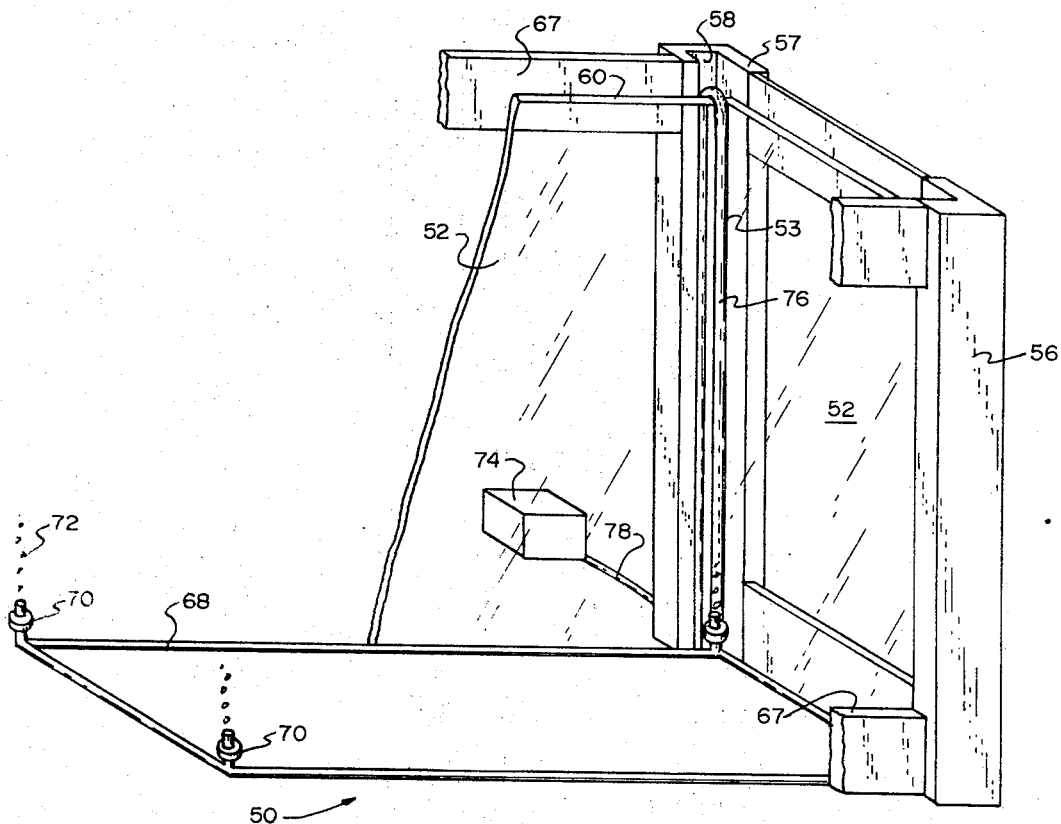
FIG. 4 illustrates in perspective one presently preferred embodiment of the air distribution system within the aquarium, portions of the aquarium being broken away to reveal otherwise hidden parts.

Attention is now directed to FIG. 4 which illustrates a conventional air pump 74 situated normally behind the aquarium 50. The air pump 74 forces air through an ascending conduit 78, the conduit 78 traversing substantially the entire length of the corner molding 57. The conduit 78 passes invisibly along the side 52 of the aquarium and emerges at the edge 60 of the glass. If desired, a notch or bore may be placed in the molding 57 adjacent the bottom end thereof to allow entrance of the ascending conduit 78.

The descending portion 76 of the conduit 78 is brought downwardly adjacent the corner 53 of the aquarium 50 so that it is generally obscured from at least two sides by the legs of the corner molding 57. If desired, annular rings (not shown) may be anchored along the bead 66 (see FIG. 2) to hold the descending portion 76 of the conduit in place.

The descending portion of the conduit 78 is in fluid communication with an air distribution conduit 68 which, in the illustrated embodiment, forms a closed loop running contiguously along all four of the bottom edges of the aquarium. If desired, the distribution conduit may have a generally U-shaped, open configuration. Adjacent the four opposing corners of the aquarium a bubble-emitting tube is connected to the closed loop of the air distribution conduit 68. It has been found that the bubble-emitting tubes may be placed in any convenient suitable location around the periphery of the bottom of the aquarium 50 as long as the locations facilitate maximum displacement of water along opposed sides of the aquarium. The air distribution conduit 68 is a closed loop in order to more conveniently apply a generally uniform and equal amount of air to each of the bubble-emitting tubes. Of course, the same object could be achieved by using serially varying sized bubble-emitting tubes along an air distribution conduit which is not a closed loop.

Figure 5:
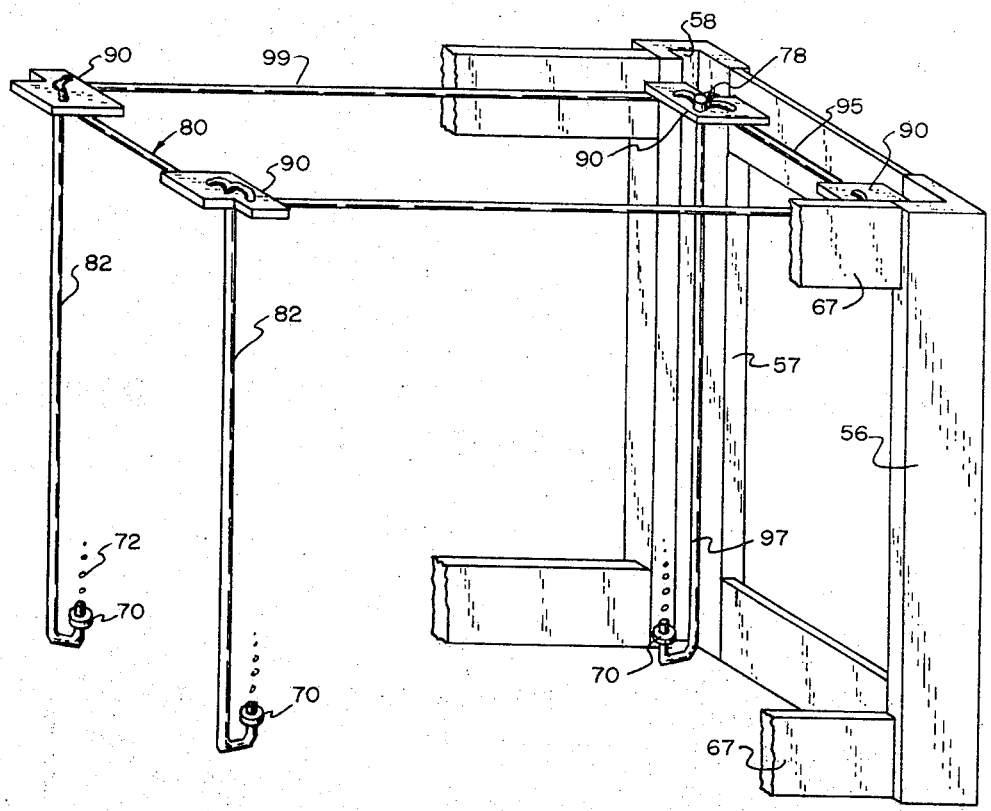
FIG. 5 illustrates in perspective still another presently preferred embodiment of the air distribution system within the aquarium, portions of the aquarium being broken away as in the FIG. 4 embodiment.

A second presently preferred embodiment of the air distribution system of the invention is illustrated in FIG. 5. The same air pumping and delivery system described in connection with FIG. 4 can also be used with the embodiment of FIG. 5. With continued reference to FIG. 5, as the ascending delivery tube 78 emerges from the top channel 58, it is connected in fluid communication to an air distribution conduit 80. The air distribution conduit 80 is preferably a closed loop conduit situated adjacent the upper periphery of the aquarium 50. In the FIG. 5 embodiment, each corner of the aquarium is provided with a tube-retaining platform 90. A presently preferred embodiment of the tube-retaining platform 90 is illustrated best in FIG. 6.

Figure 6:
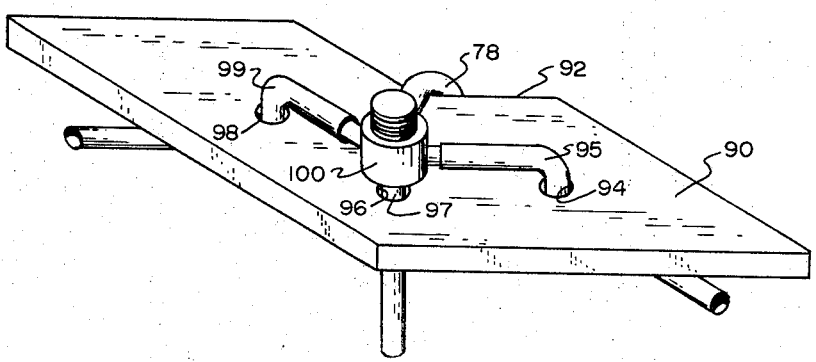
FIG. 6 is an enlarged perspective view of one presently preferred air tube assembly used with the air distribution system of FIG. 5.

Referring now to FIG. 6, the platform 90 is generally rectangular in configuration and it is adapted to be secured to the upper edge 60 of the sides 52 in each corner of the aquarium 50 (compare FIG. 3). Preferably, the platform 90 has a notch 92 at one corner through which the distribution conduit 78 passes to the upper surface of the platform 90 from the channel 58 (FIG. 5). It is also presently preferred that the conduit 78 pass beneath the platform 90 to attach to the valve 100 below the platform surface. The notch 92 allows a suitable lid 64 (FIG. 1) to rest upon the upper surface of the platform 90 without collapsing the tube 78. The lid is also desirably spaced above the glass by the platform 90.

Platform 90 has apertures 94, 96 and 98 arranged in spaced relation. Each of the apertures receives corresponding air-transmitting conduits 95, 97 and 99, respectively. Clearly, if desired, additional attachment sites for heaters or other support equipment (not shown) could be formed in the platform 90. The end of the conduit 95, 97 and 99 illustrated in FIG. 6 is connected in fluid-communication with a valve 100. A conventional T-shaped connector could also be used. The valve 100 is also in communication with the delivery conduit 78 which is the air source for the valve 100. The valve 100 may be any one of a wide variety of suitable conventional valves. The valve 100 directs air downwardly through the tube 97 which is in turn connected to a bubble emitter 70 essentially directly beneath the plate 90. Also, the valve 100 channels air through the connecting conduits 95 and 99 serially to similar platforms 90 in each of the corners of the aquarium so that air from the distribution tube 78 is available over the closed loop 80. In each corner, valves similar to valve 100 direct air through depending tubes 82 each of which is in fluid communication with a corresponding bubble emitter 70. It is pointed out that the platforms 90 maintain the closed loop air distribution conduit 80 directly behind the upper edge moldings 67 so that the conduit 80 is substantially obscured from view.

It is presently preferred that at least one of the valves 100 be adjustable to control the volume of air through the downwardly directed tube 97. In fact, it has been found advantageous to provide volume control valves at each of the corners of the aquarium so that the amount of air emerging from the bubble emitters 70 can be balanced. Air balancing can be very useful in maximizing the efficiency of water circulation as will now be more fully described.

Figure 7:
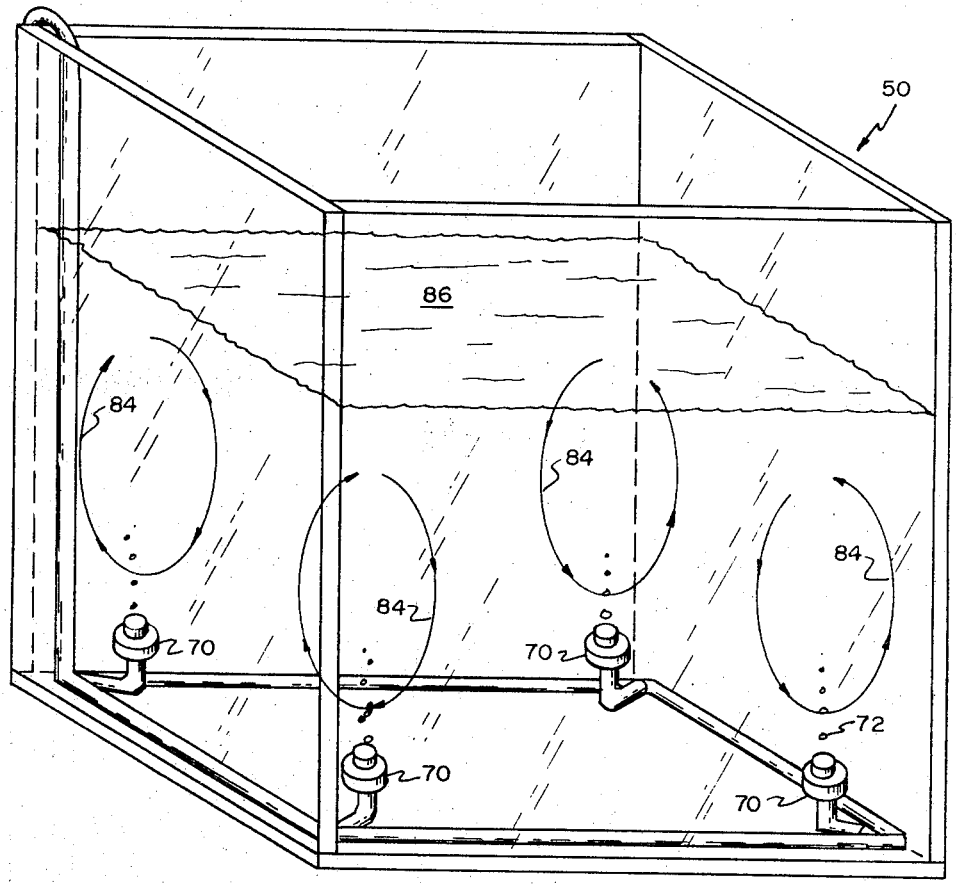
FIG. 7 is a schematic illustration of the water circulation resulting from operation of the air distribution systems of FIGS. 4 and 5.

Referring now to FIG. 7, the water circulation accommodated by the described embodiments of the invention will now be more fully described, it being recognized that although the air distribution assembly discussed in connection with FIG. 4 is schematically illustrated, the other described embodiments would equally apply. In order to maintain salt water life, vigorous circulation of water 86 within the aquarium 50 must be achieved. With reference to FIG. 7, it will be observed that a current in the direction of arrow 84 is established by the regular escapement of air bubbles 72 through bubble emitter 70. As the bubbles 72 rise from the bubble emitter 70, the entrapped water between the bubbles is carried upwardly thereby forming a current in the direction of arrow 84. The aquarium 50 is constructed dimensionally, as previously described, to retain a column of water 86 which has a depth equal to or exceeding the linear length of the remaining two dimensions. That depth differential is important to the harmonic flow of water within the aquarium 50. When the bubble emitting tubes 70 are placed in opposite corners of the aquarium or are placed in each corner of the aquarium as shown in FIG. 7, a surprisingly vigorous current results in the water contained within the aquarium 50.

It is presently believed that the depth of the water is important because of the increased energy which is transmitted to a unit volume of water by the displacement force of the bubble as it traverses the distance from the bubble-emitting tube 70 to the top of the water column 86. The horizontal dimensions of the aquarium are also related to the vertical dimension of the column of water since the energy imparted to a unit volume of water by any one bubble-emitting tube 70 may be added in harmonic relation to the energy imparted to the water by any other bubble-emitting tube 70 to form a vigorous and surprisingly rapid circulation within the aquarium 50. As can be appreciated, the relationship between the depth of water and the horizontal dimensions of the column of water is such that a maximum current will arise only under specific combinations of water volume and depth.

The aquarium described in accordance with the illustrated embodiments is preferably provided with a conventional aerobic or underground filter. The described water movement is surprisingly effective in releasing carbon dioxide, nitrogen and other gases and in obtaining oxygen at the water surface and transporting the oxygen to the underground filter. The aerobic bacteria in the filter can then be more effective in disposing of waste.

The Method of Construction

In the construction of the aquarium 50, corner moldings 56 and 57 are obtained and cut to desired lengths. Preferably, the channel 58 is formed in corner moldings 57, where desired. The sides 52 and bottom 54 are then cut to size.

Following the cutting operation, an excessive amount of adhesive sealant is applied to the edges of the precut sides 52 and to the edges of the precut bottom 54. As the edges are pressed one against another, a certain amount of adhesive sealant exudes from between the junction of the edges both toward the outside of the container and toward the inside. This exuding adhesive sealant compensates for irregularities in cutting the edges of the glass or plastic sheet. In addition, the exuded sealant serves as adhesive material for bonding the corner moldings 56 and 57 and edge moldings 61 to the adjacent sides 52. The L-shaped corner moldings may be supplied with spaced applications of adhesive and pressed tightly against the corner 53. The spaced adhesive along with the exuded excess adhesive firmly adheres the corner molding to the aquarium 50. Also, as best illustrated in FIG. 2, the adhesive sealant which exudes to the interior of the aquarium may be smoothed and distributed to form a bead 66 along the inside corners.

In the formation of the bead 66, an initial bonding bead is formed when excess sealant is smoothed over the corner 53. When the bonding bead has cured sufficiently, a second sealing bead is superimposed over and beyond the bonding bead and a finger or other suitable instrument is used to force the sealing bead firmly against the sides 52 and bottom 54 thereby forming bead 66.

The lower and upper edge moldings 61 and 62 are supplied with adhesive and pressed firmly in place between the corner moldings 56 and 57 along the lower and upper peripheral edges of the aquarium 50. It is presently preferred that a bead of adhesive (not shown) be formed between the upper edge 60 of the sides 52 (FIG. 3) and the adjacent corner and edge moldings so as to provide a water seal. The water seal prevents water accumulating on the edge 60 from running down the exterior of the sides 52. Also, the bead (not shown) may serve as a bumper for lid 64.

The construction method described herein is substantially more rapid and less tedious than prior art techniques because fine cutting tolerances, finished edges and tedious cementing techniques necessary to avoid bubbles are not necessary. The moldings obscure finishing irregularities and strengthen the construction. Therefore, masking and conventional time-consuming clean up of joints is obviated. The problems of excess adhesive have been changed by this invention to advantage.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A non-corrosive aquarium comprising:
   water-retaining sides and bottom;
   sealing means holding the sides and bottom in leak-proof contiguous relation;
   non-corrosive corner molding means capable of transferring surface pressure on a water-retaining side to generally lateral force on the contiguous water-retaining sides; and
   channel means within at least one corner molding means invisibly containing external support conduits parallel to and exterior of the water-retaining sides of the aquarium.

2. A non-corrosive aquarium as defined in claim 1 wherein said water-retaining sides comprise transparent glass surfaces.

3. A non-corrosive aquarium as defined in claim 1 wherein said non-corrosive corner molding means comprises decorative carved wood.

4. A non-corrosive aquarium as defined in claim 1 wherein said non-corrosive corner molding means comprises decorative plastic.

5. A non-corrosive aquarium as defined in claim 1 further comprising lid-retaining means extending along the upper portion of the sides and projecting vertically therefrom so as to mask visible irregularities where the lid rests upon the sides.

6. A non-corrosive aquarium as defined in claim 5 wherein said lid-retaining means comprises decorative wood strips.

7. A non-corrosive aquarium as defined in claim 5 wherein said lid-retaining means comprises decorative plastic strips.

8. A method of constructing a non-corrosive aquarium comprising the steps of:
    forming water-retaining sides and bottom;
    applying an excessive amount of adhesive sealant to the edges of the sides and bottom;
    uniting the sides and bottom in contiguous relation to form corners of an open topped container by forcing the sides and bottom together so that excess sealant exudes to the exterior of the container;
    pressing non-corrosive corner moldings against the outside corners using the exuded adhesive sealant to bind the molding to the corner; and
    forming a conduit channel in one non-corrosive corner molding to invisibly contain external support conduits.

9. A method of constructing a non-corrosive aquarium as defined in claim 8 further comprising smoothing adhesive sealant exudate against the inside junction between the sides and between the sides and bottom, allowing the sealant to at least partially cure; thereafter superimposing a second sealing bead over and beyond the exuded sealant; and urging the sealant against the aquarium side.

10. A method of constructing a non-corrosive aquarium as defined in claim 9 wherein said smoothing step comprises using a blunt rounded instrument to form a concave bead of sealant along the inside edges.

11. A method of constructing a non-corrosive aquarium as defined in claim 8 further comprising applying non-corrosive strips along the top edge with adhesive to form a lid retainer which projects above the lid-receiving upper edge of the sides to mask visible irregularities where the lid and edge meet.

12. Aquarium water circulating apparatus comprising:
    an aquarium having a vertical dimension which will support a column of water having a depth equal to or exceeding the remaining two linear dimensions;
    an air distribution conduit which forms distribution outlets on at least two opposing corners placed within the aquarium;
    bubble emitting means for inducing harmonic water flow within the aquarium, the bubble emitting means being connected to the air distribution outlets of the conduit and placed in the opposing corners of the aquarium near the bottom; and
    air pressure generating means connected to the input port of the air distribution conduit.

13. Water circulating apparatus as defined in claim 12 wherein the air distribution conduit is placed in a closed loop along the bottom edges of the aquarium.

14. Water circulating apparatus as defined in claim 12 wherein the air distribution conduit is placed along the top edges of the aquarium.

15. A method of circulating water in an aquarium comprising the steps of:
    constructing an aquarium such that the aquarium will support a column of water having a vertical dimension which is equal to or exceeds the remaining two linear dimensions; and
    producing a harmonic flow of water by emitting air bubbles in at least two opposing corners of the aquarium.

16. A method of circulating water in an aquarium as defined in claim 15 wherein said producing step comprises conducting air along a closed loop thereby supplying the air bubble emitters with a generally equal amount of air at a constant pressure.

17. A method as defined in claim 8 wherein said pressing step comprises placing bottom edge moldings against the sides using exuded adhesive sealant to bind the molding to the sides.

* * * * *